Figures 1, 2:
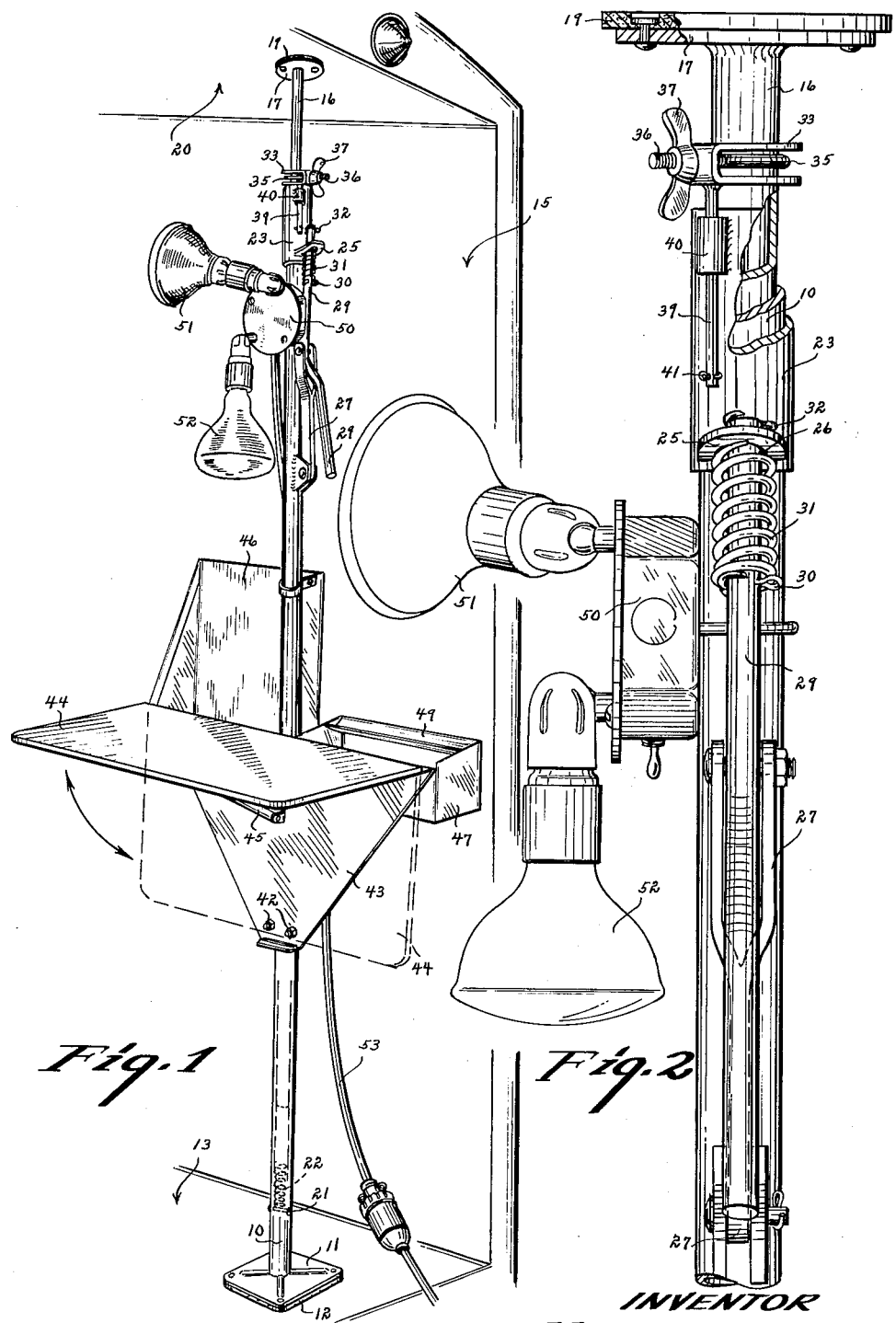

May 14, 1963

E. A. POWELL 3,089,742

PORTABLE WORK COUNTER

Filed April 24, 1961

2 Sheets-Sheet 1

WITNESS
NORMAN G. TRAVISS

INVENTOR
EARL A. POWELL
BY Talbert Dick & Earley
ATTORNEYS

May 14, 1963 E. A. POWELL 3,089,742
PORTABLE WORK COUNTER
Filed April 24, 1961 2 Sheets-Sheet 2
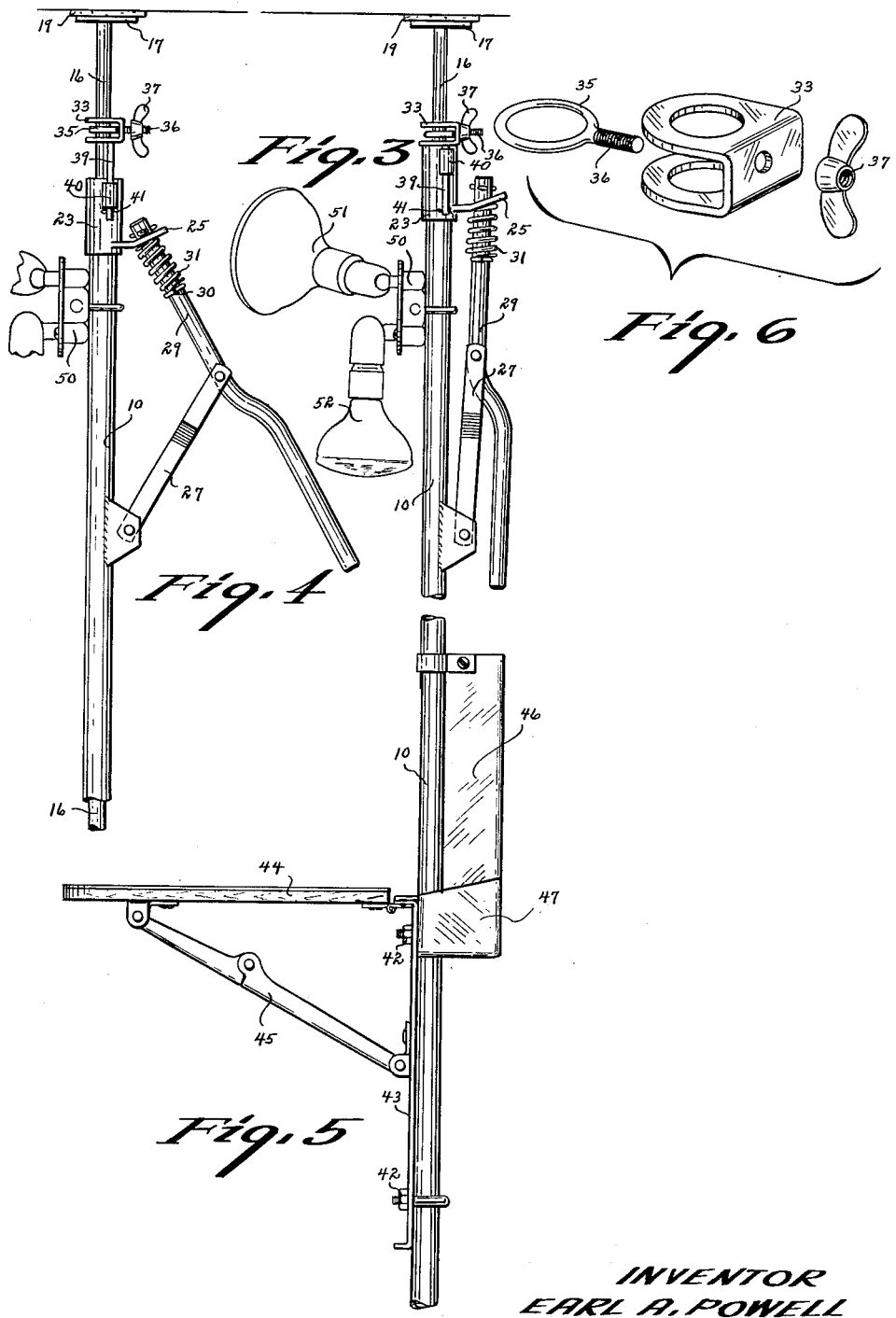

United States Patent Office 3,089,742
Patented May 14, 1963

3,089,742
PORTABLE WORK COUNTER
Earl A. Powell, 3901 E. 38th St., Des Moines, Iowa
Filed Apr. 24, 1961, Ser. No. 105,019
11 Claims. (Cl. 312—223)

This invention relates to a portable work counter and more particularly to one that may be used in the merchandise compartment of hauling vehicles. The major amount of goods manufactured in this country is shipped or hauled by truck. Usually the compartment containing the merchandise has a floor, ceiling and sides, such as is found in freight and express trailers, vans and like. Obviously, such goods holding areas contain merchandise going to many different addresses. Records, instructions, bills of lading, receipts and like must be maintained and handled relative to the merchandise being received into the hauling vehicle as well as merchandise being removed from the vehicle. A common work bench in the merchandise compartment is not the answer because of its size and bulk. Furthermore, such a work bench does not have illumination nor can it be easily and quickly moved to various locations in the compartment. Still another objection to the common work bench is that it has no provision for rigidly detachably securing it to the hauling vehicle.

Therefore, one of the principal objects of my invention is to provide a portable compact work counter for use in the merchandise compartment of hauling vehicles.

A further object of this invention is to provide a collapsible work counter for hauling vehicles that has incandescent electric light means.

A still further object of this invention is to provide a ceiling and floor engaging work counter means that will successfully conform to various ceiling heights.

A still further object of this invention is to provide a ceiling and floor engaging work counter means that may be easily and quickly installed or removed.

Still further objects of my invention are to provide a portable adjustable collapsible work counter for hauling vehicles or like that is economical in manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my device in use,

FIG. 2 is an enlarged side view of the upper portion of my device with sections cut away to more fully illustrate its construction, FIG. 3 is an enlarged side view of the upper portion of the device in use and shows the lever in tightening position, FIG. 4 is a side view of the upper portion of my device illustrating the lever means elevated for installing or detaching the device from the ceiling of a compartment, FIG. 5 is a side view of the desk portion of the device, and FIG. 6 is an exploded view of the ceiling height adjustment means.

Although I describe my device for use in hauling vehicles, obviously it may be used to advantage in any type of room or compartment having a floor and a ceiling.

In the drawings I have used the numeral 10 to designate the lower pipe standard. Secured to the bottom end of the pipe 10 is a foot 11 having a resilient pad 12, adapted to engage and rest on the floor 13 of a compartment 15. Slidably extending through the upper open end of the standard 10 is the upper pipe standard 16. On the upper end of the standard 16 is a plate 17 having a pad 19 adapted to engage the ceiling 20 of a compartment as shown in FIG. 1. The numeral 21 designates a pin extending through the standard 10 near its lower end. The numeral 22 designates a coil bumper spring in the standard 10 and having its lower end supported by the pin 21. Slidably embracing the upper end portion of the standard 10 is a cylindrical bearing 23. The numeral 25 designates an ear extending from the bearing 23 and having a hole 26. The numeral 27 designates an arm having its lower end hinged to the standard 10. The numeral 29 designates a hand lever rod having its center length portion hinged to the upper end of the arm 27 and its upper end portion loosely slidably extending through the hole 26 of the ear 25 as shown in FIG. 2. Extending through the lever and spaced below the ear 25 is a cotter pin 30. The numeral 31 designates a coil spring embracing the lever, having an end engaging the top of the cotter pin 30 and its other end engaging the underside of the ear 25. The numeral 32 designates a retaining cotter pin extending through the top end of the lever and above the ear 25. The numeral 33 designates a U-shaped washer having each of its end portions slidably embracing the standard 16. The numeral 35 designates a ring slidably embracing the standard 16, and positioned between the two end portions of the U-shaped washer 33. This ring 35 has a radially extending threaded shaft 36 slidably extending through the base of the washer 33 as shown in FIG. 4. The numeral 37 designates a wing nut threaded onto the shaft 36. By this construction when the nut 37 is tightened, the ring 35 will bind on the standard 16, and the washer 33, ring 35, shaft 36 and nut 37 will become a stop means limiting the bearing 23 in its upward sliding movement relative to the standard 16. The U-shaped washer also acts as a limiting stop means (when the nut 37 is tightened) for adjustably limiting the downward sliding of the standard 16 into the standard 10. To limit the sliding upward movement of the standard relative to the bearing member, I secure a downwardly extending shaft 39 slidably extending through a collar 40 on the bearing member 23. A pin 41 extends through the free end of the shaft 39 to prevent its complete withdrawal from the collar 40. The parts thus far described not only make the device operatable but permit easy and quick adjustment to accommodate different height ceilings. To install the device the nut 37 is loosened so that the standard 16 may easily slide through the U-shaped washer 33 and ring 35. The hand lever 29 is raised as shown in FIG. 4. The standard 16 is slid upwardly until the pad 19 engages the ceiling 20. The U-shaped washer 33 is slid upwardly on the standard 16, but is properly stopped at the correct position above the bearing 23 by the pin 41. At this time the nut 37 is tightened to lock the U-shaped washer 33 and ring 35 on the standard 16. The next and last step is to lower the lever 29 to a position shown in FIG. 3. This last action brings the bearing member 23 in contact with the U-shaped washer 33 and the final lowering of the lever will be against the resiliency of the coil spring 31. This spring resiliency will be transferred from the ear 25, to the bearing 23, to the U-shaped washer and then to the standard 16. The standard 16 will therefore be in yieldable engagement with ceiling. To remove the device, the hand lever 29 is raised to a position as shown in FIG. 4 to permit the U-shaped washer and standard 16 to slide downwardly a limited distance from the ceiling. Inasmuch as the U-shaped washer 33 is still rigidly secured to the standard 16, the device will remain in proper adjustment for quick installation between floors and ceilings of similar ceiling height. To readjust the device for a different ceiling height, the nut 37 must be loosened and the new adjustment made as heretofore explained. The spring 22 will yieldingly catch the lower end of the standard when the nut 37 is loosened. Once the device is detachably installed between a floor and ceiling, it will be of a strong rigid nature.

Vertically adjustably secured to the standard 10, by bolt means 42, is a vertical base plate 43. Hinged to this base is a work counter table top 44 as shown in FIG. 5. This top 44 is held in a horizontal position by an ordinary breakaway hinge arm 45. To lower the top 44 to an inoperative vertical position as shown in broken lines in FIG. 1, the hinge arm 45 is broken to fold. Any number of record containers may be secured to the plate 43. In the drawings I show a book type open container 46, and a more shallow container 47. A pencil tray 49 may be in the rear open top of the container 47. Inasmuch as the use of the device may be in at least partial darkness, an artificial light means is desirable on the standard 10 and above the table top. The numeral 50 designates a light fixture on the standard 10. Two adjustable incandescent light bulbs 51 and 52 are mounted on the fixture 50. If desired, one of these bulbs may be a heat lamp. An electric cord 53 extends from the fixture 50 and is adapted to be in communication with a source of electrical energy.

From the foregoing it will be appreciated that my device may be installed in any desired position in the compartment 15 and when the desk table is lowered, the entire device will occupy a minimum of space area.

Some changes may be made in the construction and arrangement of my portable work counter without departing from the real spirit and purpose of my invention, and it is my intention to cover by my claims, any modified forms of structure or use of mechanical equivalents which may be reasonably included within their scope.

I claim:

1. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said second standard capable of being engaged by said bearing, and a work counter operatively secured to said first standard.

2. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means vertically adjustable on said second standard capable of being engaged by said bearing, and a work counter operatively secured to said first standard.

3. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said second standard capable of being engaged by said bearing, and a work counter operatively hingedly secured to said first standard.

4. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said second standard capable of being engaged by said bearing, means for limiting the distance between said bearing and said stop on said second standard, and a work counter operatively secured to said first standard.

5. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said lever and above said ear, a stop means on said second standard capable of being engaged by said bearing, and a work counter operatively secured to said first standard.

6. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said second standard capable of being engaged by said bearing, and a work counter operatively secured to said first standard; the lower end of said first standard and the upper end of said second standard, each, being in the form of a resilient foot.

7. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said second standard capable of being engaged by said bearing, means for vertically adjusting said stop means on said second standard, and a work counter operatively secured to said first standard.

8. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said second standard capable of being engaged by said bearing, and a work counter operatively secured to said first standard; said stop means on said second standard being in the form of a U-shaped washer with each of its end portions slidably embracing the second standard, a ring slidably embracing the second standard and positioned between the two ends of said U-shaped washer, a threaded rod on said ring slidably extending through the center area of said U-shaped washer, and a nut threaded on said rod.

9. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, a stop means on said second standard capable of being engaged by said bearing, incandescent light means on said first standard, record and like receiving compartment on said first standard, and a work counter operatively secured to said first standard.

10. In a portable work counter, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a coil spring embracing said lever having one end engaging said stop means and its other end engaging said ear, and a stop means on said second standard capable of being engaged by said bearing.

11. In an extensible prop, a first pipe standard adapted to have its lower end engaging a supporting surface, a second pipe standard slidably extending into said first standard and adapted to have its upper end engaging a ceiling, a bearing slidably embracing the upper end portion of said first standard, an ear on said bearing, an arm having its lower end hinged to said first standard, a lever having its central length area hinged to the other end of said arm, and its upper end portion slidably extending through said ear, a stop means on said lever and below said ear, a stop means on said lever above said ear, a coil spring embracing said lever having one end engaging said stop means below said ear and its other end engaging said ear, a stop means on said second standard capable of being engaged by said bearing, said stop means on said second standard being in the form of a U-shaped washer with each of its end portions slidably embracing the second standard, a ring slidably embracing the second standard and positioned between the two ends of said U-shaped washer, a threaded rod on said ring slidably extending through the center area of said U-shaped washer, a nut threaded on the outer end of said rod, a shaft extending downwardly from said stop means on said second standard and slidably connected to said bearing, and means on said shaft to prevent its separation from said bearing.

References Cited in the file of this patent
UNITED STATES PATENTS

| | | |
|---|---|---|
| 1,476,450 | Lee | Dec. 4, 1923 |
| 2,010,990 | Hoover | Aug. 13, 1935 |
| 2,232,031 | Kavanagh | Feb. 18, 1941 |
| 2,793,286 | Stiffel | May 21, 1957 |
| 2,858,094 | Olson | Oct. 28, 1958 |
| 2,991,040 | Levy | July 4, 1961 |